United States Patent [19]

Gault

[11] 3,728,792
[45] Apr. 24, 1973

[54] CUTTING BLADES FOR POWERED CARVING KNIVES

[75] Inventor: Robert Gault, Sheffield, England

[73] Assignee: J. R. A. Steel Processing, Limited, Sheffield, England

[22] Filed: Nov. 25, 1970

[21] Appl. No.: 92,797

[30] Foreign Application Priority Data

Nov. 28, 1969  Great Britain.....................58,284/69

[52] U.S. Cl. ..................................................30/355
[51] Int. Cl. ............................................B26b 9/02
[58] Field of Search.........................30/211, 212, 241, 30/242, 243, 272 A, 355, 223, 224, 225, 208, 209

[56] References Cited

UNITED STATES PATENTS

| | | | |
|---|---|---|---|
| 2,748,477 | 6/1956 | Smith | 30/208 |
| 2,756,500 | 7/1956 | Green | 30/211 |
| 3,276,118 | 10/1966 | Taylor | 30/272 A |
| 3,346,956 | 10/1967 | Wezel | 30/355 X |

*Primary Examiner*—Granville Y. Custer, Jr.
*Assistant Examiner*—J. C. Peters
*Attorney*—Lowe and King

[57] ABSTRACT

Each of a pair of blades for use in a powered knife is formed with a bent transverse cross-section whereby the two blades together create a hollow space between the blades, whereby appreciably thinner material may be used as compared with conventional flat blades, thus representing a considerable saving of material and the hollow space acts as a clearance area for any particles or debris created by the cutting action which particles or debris would be liable to create excessive friction between or jamming of conventional flat blades. The blades are preferably made of stainless steel, and the cutting edges are preferably serrated.

5 Claims, 8 Drawing Figures

Patented April 24, 1973
3,728,792
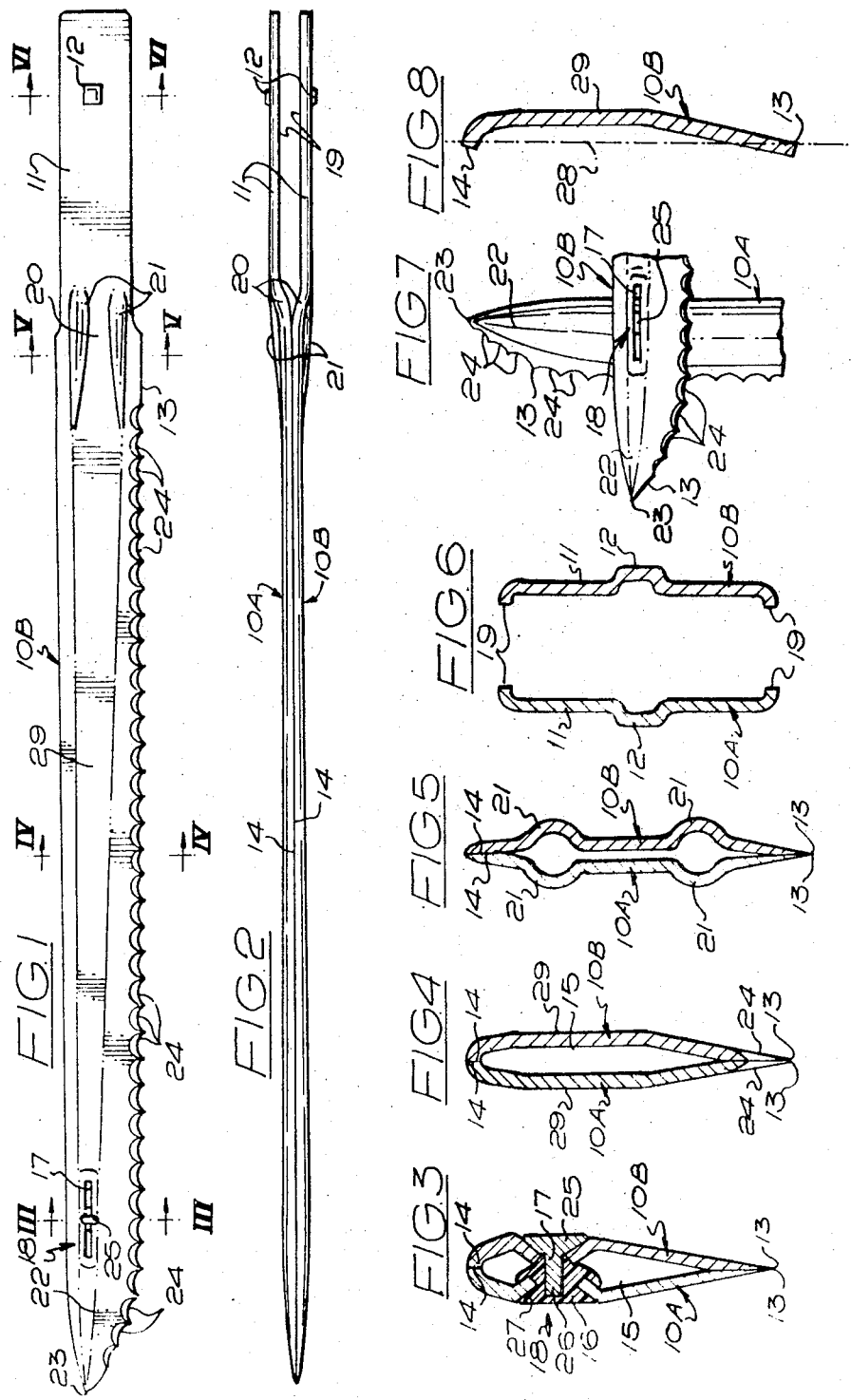
INVENTOR
BY ROBERT GAULT
Lowe & King

CUTTING BLADES FOR POWERED CARVING KNIVES

This invention relates to improvements in the construction and configuration of the cutting blades used in electric carving knives, and has for its object the provision of blades acting in pairs of such a shape as to produce a self-sharpening action, as well as a rigidity commensurate with the cutting pressures involved, and a configuration permitting easy cleaning of the pairs of blades.

According to the present invention, a pair of blades for use in an electric carving knife are of fundamentally straight longitudinal configuration and bent transverse cross-section, with at least one longitudinal edge of each blade tapering in section to form cutting edges, the blades being placed together with their concave faces facing each other and with the pairs of longitudinal edges in contact with each other, whereby a hollow space is created between the blades.

The combined form of the two blades has considerable rigidity, and as compared with conventional powered knife blades of flat or externally hollow ground cross-section, blades according to the invention can be formed of appreciably thinner material thus representing a considerable saving of material. In addition, the hollow space created between the blades acts as a clearance area or relief channel for any particles or debris created by the cutting action, which particles or debris would be liable to create excessive friction between or jamming of conventional with completely flat contacting faces blades.

While the invention will be considered primarily as made of stainless steel, any other suitable material may be employed.

The cutting performance may be improved by serrating the cutting edges, e.g., by scalloping, toothing, or forming with some other shape of cutting edge. The other pair of longitudinal edges may also be tapered in section to form cutting edges, or (preferably) the may be non-cutting edges and curved to come into contact with each other so as to avoid being dangerous. The mutually facing surfaces of all the contacting pairs of edges are preferably coplanar. The small area of contact between the cutting edges, as compared with the area of contact with conventional blades, minimizes frictional resistance and results in a self-sharpening action of the cutting edges.

The blades may be bent to a curved, angular or facetted cross-section by pressing between dies, enabling the simultaneous punching of holes and slots for a sliding connection near the tips of the blades, and the simultaneous pressing from integral shanks of driving formations, such as projections, holes or slots for engagement in a power pack of a knife assembly. The blades may be provided, alternatively, with separate shanks, e.g., of stainless steel riveted thereto, or of plastics material moulded thereon, or even interchangeably connected thereto. The bent cross-section may be uniform throughout the length of the blades, excluding any integral shanks, or (preferably) the cross-section may change progressively from a wider shallower section nearer the shanks to a narrower deeper section nearer the tips, so that the combined form is thinner nearer the shanks where slicing is commonly effected and thicker nearer the tips where greater rigidity is advantageous for piercing. The tips of the blades are preferably curved gradually to points, and any serrations along the cutting edges may extend substantially to the points. The serrations may be formed by grinding after bending of the blades, or they may be formed by corrugating the cutting edges during bending of the blades and grinding flat the sides of the corrugations that will be mutually facing when the blades are paired.

The invention will now be further described with reference to a preferred embodiment, by way of example only, and with reference to the accompanying drawings, in which :

FIG. 1 is a side elevation of a pair of blades according to the invention, for use in a powered knife;

FIG. 2 is a plan view of FIG. 1;

FIGS. 3 to 6 are enlarged sections on the lines III—III, IV—IV, V—V and VI—VI respectively of FIG. 1;

FIG. 7 corresponds to the left-hand end of FIG. 1, but shows how the two blades are fitted together or separated; and FIG. 8 corresponds to the right-had side of FIG. 4, but shows how the cutting edge may be conveniently formed.

In FIGS. 1 to 7, a pair of blades 10A, 10B, for use in a powered knife, have shanks 11 with driving projections 12 for engagement in the power-pack (not shown) of the knife.

The blades 10A, 10B are of fundamentally straight longitudinal configuration and bent transverse cross-section, with one longitudinal edge 13 of each blade tapering in section to form cutting edges, whereby when the blades are placed together with their concave faces facing each other and with the other pair of longitudinal edges 14 in contact with each other, the cutting edges 13 are in contact with each other and a hollow space 15 is created between the blades.

The combined form of the two blades 10A, 10B has considerable rigidity, and as compared with conventional power knife blades of flat or externally hollow-ground cross-section, the blades 10A, 10B can be formed of appreciably thinner stainless steel. For example, the blades illustrated have been designed to be formed of 0.60 mm. thick stainless steel and to have at least the same rigidity as conventional flat blades each 1.5 mm. thick, a saving of the order of 60 percent of expensive metal. As compared with other conventional flat blades each 1.0 mm. thick, the blades illustrated represent a saving of the order of 40 percent of expensive metal, but also afford greater rigidity. The hollow space 15 created between the blades 10A, 10B acts as a clearance area or relief channel for particles or debris created by the cutting action, which particles or debris may be liable to create excessive friction between or jamming of conventional blades with completely flat contacting faces.

The blades 10A, 10B are bent by pressing between dies (not shown) with the simultaneous punching of a hole 16 in one blade 10A and a slot 17 in the other blade 10B for a sliding connection 18 (to be described in detail presently), and the simultaneous pressing of the driving projections 12 in the shanks 11. The bending of the blades results in a facetted cross-section changing (as illustrated by FIGS. 5, 4 and 3) from a wider shallower section nearer the shanks to a narrower deeper section nearer the tips, so that (as is particularly illustrated by FIG. 2) the combined form is thinner nearer the shanks where slicing is commonly effected and thicker nearer the tips where greater rigidity is advantageous for piercing. The shanks 11 have inturned edges 19 to afford them comparable rigidity and to afford a close fit in the power pack, and a cranked transition portion 20 of each blade is formed with a pair of pressed ribs 21 to prevent bending of the blades in this region under lateral forces applied to the blades when in use. The blades illustrated have been designed so that their combined overall thickness is favorably comparable with either of those appertaining to conventional flat blades; i.e., the combined overall thickness nearer the shanks is no greater than 2.0 mm. and nearer the tip is no less than 3.0 mm., thus combining the slimness nearer the shanks (i.e., in the "slicing region") of conventional flat blades of 1.0 mm. thickness with the rigidity nearer the tips (i.e., in the "probing region") of conventional flat blades of 1.5 mm. thickness.

The tips 22 of the blades 10A, 10B are curved gradually to points 23, and serrations 24 (formed by scalloping the cutting edges 13) extend substantially to the points.

The siding connection 18 (which permits the blades to be reciprocated in sliding contact with respect to each other by the power pack, to produce the cutting action) comprises the slot 17 and a T-shaped member 25 the stem 26 of which is embedded in plastics material 27 (see FIG. 3), in and around the hole 16, separation of the blades being effected by turning the blades to right angles to each other at the connection 18 (as shown in FIG. 7) for the head of the T-shaped member 25 to pass through the slot 17.

FIG. 8 shows, in relation to the blade 10B at the section shown in FIG. 4, how the mutually facing surfaces of the edges 13, 14 can be produced by grinding down to a common plane 28 parallel to the middle facet 29 of the bent cross-section of the blades, at the same time producing the actual cutting edges 13. The serrations 24 may be formed by grinding with a form wheel (not shown) after grinding down to the plane 28, or they may be formed by corrugating the edge 13 before grinding down to the plane 28.

What I claim is:

1. A pair of blades for use in an electric carving knife having each blade formed with a fundamentally straight longitudinal configuration and a bent transverse cross-section, with at least one longitudinal edge of each blade tapering in section to form cutting edges, shanks on the blades with driving formations for engagement in the power pack of an electric carving knife assembly, said bent cross-section changing progressively from a wider shallower section nearer the shanks to a narrower deeper section nearer the tips, said blades tapering in section to form cutting edges on at least one longitudinal edge of said blades, said blades being placed together with their concave faces facing each other and with the pairs of longitudinal edges in contact with each other, whereby a hollow space is created between the blades.

2. A pair of blades as in claim 1, wherein the contacting blade cutting edges are serrated.

3. A pair of blades as in claim 1 wherein the other pair of longitudinal edges are non-cutting edges and are rounded to come into contact with each other.

4. A pair of blades as in claim 1 wherein the mutually facing surfaces of the contacting pairs of edges are coplanar and are the only substantial contacting surfaces of the blades.

5. A pair of blades as in claim 1, wherein the tips of the blades are curved gradually to points, and the cutting edges are serrated and the serrations extend substantially to the points of the cutting edges.

* * * * *